United States Patent [19]

Wessels

[11] Patent Number: 5,465,990

[45] Date of Patent: * Nov. 14, 1995

[54] LOCKING SYSTEM FOR A SEMITRAILER SLIDING UNDERCARRIAGE

[76] Inventor: Larry L. Wessels, 549 S. Xenon Ct., Lakewood, Colo. 80228

[*] Notice: The portion of the term of this patent subsequent to May 24, 2011, has been disclaimed.

[21] Appl. No.: 381,290

[22] Filed: Jan. 31, 1995

Related U.S. Application Data

[63] Continuation of Ser. No. 151,349, Nov. 12, 1993, abandoned, which is a continuation-in-part of Ser. No. 996,580, Dec. 24, 1992, Pat. No. 5,314,201.

[51] Int. Cl.$^6$ .................................................. B62D 53/06
[52] U.S. Cl. .................................... 280/407.1; 280/149.2; 180/209
[58] Field of Search ............................ 280/149.2, 407.1, 280/405.1, 482, 432, 428; 180/209, 24.02

[56] References Cited

U.S. PATENT DOCUMENTS

| 4,286,797 | 9/1981 | Mekosh, Jr. et al. | 280/149.2 |
| 4,353,565 | 10/1982 | Smith et al. | 280/149.2 |
| 4,838,578 | 6/1989 | Baxter | 280/149.2 |
| 4,944,522 | 7/1990 | Hart | 280/149.2 |
| 5,137,296 | 8/1992 | Forman | 280/407.1 |
| 5,199,732 | 4/1993 | Lands et al. | 280/407.1 |

Primary Examiner—Kenneth R. Rice
Assistant Examiner—Paul N. Dickson
Attorney, Agent, or Firm—Edwin H. Crabtree; Donald W. Margolis; Ramon L. Pizarro

[57] ABSTRACT

A pneumatic locking system mounted on a sliding undercarriage of a semitrailer, the semitrailer pulled by a tractor. The locking system is used for securing and releasing a sliding undercarriage from a pair of parallel rails mounted on an underside of the semitrailer, the parallel rails having spaced apart locking pin holes along their length. The locking system includes one pair or two pair of air cylinders with pistons. The air cylinders are mounted on the sliding undercarriage and disposed next to the parallel rails. Locking pins are attached to each piston with a portion of the locking pins inserted into selected locking pins holes in the parallel rails when in a locked position. A 4-way air valve is connected to the air cylinders and a pressurized air source on the semitrailer. The air valve directs pressurized air to the air cylinders for retracting and extending the pistons in the cylinder. An air pressure switch is connected to a pressurized air line to the semitrailer air brakes. The air pressure switch connects to and controls the operation of the air valve when retracting and unlocking the locking pins from the locking pin holes. The air pressure switch allows pin retraction only when air pressure is released to the semitrailer air brakes and spring brakes on the semitrailer are set. A pin release lever or pin release button is attached to the air valve and is used for releasing the locking pins when the spring brakes have been set.

16 Claims, 3 Drawing Sheets

LOCKING SYSTEM FOR A SEMITRAILER SLIDING UNDERCARRIAGE

This application is a continuation of Ser. No. 08/151,349, abandoned, which is a continuation-in-part application of patent application Ser. No. 07/996,580, filed on Dec. 24, 1992, now U.S. Pat. No. 5,314,201, by the subject inventor and having a title of "LOCKING SYSTEM FOR A SEMITRAILER SLIDING UNDERCARRIAGE".

BACKGROUND OF INVENTION (a) Field of the Invention

This invention relates to a system for securing a sliding undercarriage to a semitrailer and more particularly, but not by way of limitation, to a fail-safe system used with a sliding undercarriage for securing the undercarriage to a pair of parallel rails on the underside of a semitrailer.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer.

Today, federal and state laws define weight limits per axle for tractors and semitrailers. Fines are imposed at each state port-of-entry if load limits are exceeded. By shifting the sliding undercarriage under the semitrailer, the driver can improve the balance of load between the tractor and the semitrailer to meet highway axle weight limit requirements. Also, to improve maneuverability on city streets, the sliding undercarriage can be shifted toward the tractor to shorten the unit's turning radius.

The sliding undercarriage is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally five to seven feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage structure and in a locked position project outward through locking pin holes in the rails. The locking pin holes are generally spaced three to six inches apart along the rails. The locking pins are usually spring loaded to retain them in a locked position during highway travel. The locking pins are retracted and reinserted in the locking pin holes using a manually operated locking pin release system.

Semitrailers are commonly equipped with pneumatic spring brake systems which typically operate at 90–120 psi. The spring loaded air brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from the air supply tank to overcome the brake spring bias force.

The most common way to reposition the sliding undercarriage under the semitrailer is through a process of trail and error. The driver locks the brakes on both the tractor and semitrailer. The driver then climbs out of the tractor, walks to the sliding undercarriage, and pulls or lifts the manually operated locking pin release lever which is usually positioned immediately ahead of or between the left wheels of the sliding undercarriage. Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in the retracted position while the driver returns to the tractor. The driver then releases the brakes on the tractor while leaving the brakes applied on the semitrailer's sliding undercarriage. The tractor is then driven forward or backward to slide the semitrailer relative to the sliding undercarriage. The driver, after sliding the semitrailer the distance considered correct, then reapplies the tractor brakes. The driver again leaves the tractor, walks back to the sliding undercarriage, and releases or pushes down the pin release lever. The spring loaded locking pins are usually not perfectly aligned to reinsert through locking holes. Each locking pin, when not fully reinserted, is pressed by the locking pin retaining spring against the rail at a location between two locking pin holes. The driver returns to the tractor, releases the tractor brakes, and moves the semitrailer only a few inches or less as required for the spring loaded pins to drop into the first holes in the rails that move into alignment. The driver must then reapply the brakes and walk around the semitrailer to visually verify that all pins are in locked positions. The driver then secures the locking pin release lever to the sliding undercarriage for highway travel.

The process of retracting the locking pins and sliding the bottom side of the semitrailer over the sliding undercarriage is more easily completed with the assistance of a second person. The second person pulls or lifts the locking pin release lever and assists the driver in repositioning the sliding undercarriage under the semitrailer. The manually operated pin retraction systems can become impossible to operate due to damage or corrosion of the linkage and contamination with dirt and ice from exposure under the semitrailer. Locking pins can also become stuck in the holes in the rails if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the sliding undercarriage has been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels. Fatalities related to attempts to retract and reinsert the locking pins have been reported.

The Department of Transportation highway port-of-entry weigh stations and routine highway safety inspections include verification per 49 CFR 393.207(b) that all locking pins are properly inserted. Fines may be imposed and vehicles designated out-of-service until maintenance is completed. According to this federal agency, highway accidents have been caused by locking pins not being properly inserted for securing the sliding undercarriage to the semitrailer rails.

The problems inherent in retracting and inserting locking pins with the above mentioned manually operated pin retraction apparatus have been recognized in Hart U.S. Pat. No. 4,944,522, Baxter U.S. Pat. No. 4,838,578, Smith et al. U.S. Pat. No. 4,353,565, Mekosh et al. U.S. Pat. No. 4,286,797, Vornberger U.S. Pat. No. 3,778,079, Glassmeye U.S. Pat. No. 3,618,969, Lands et al. U.S. Pat. No. 5,199,732, and Forman U.S. Pat. No. 5,137,296.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert locking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patent to Smith et al. describes a few of the features incorporated into the novel system described herein, but the Smith et al. disclosure, for example, does not include a fail-safe system wherein a pressure transducer provides control to automatically reinsert the locking pins should a semitrailer's spring brakes be released when the locking pins are retracted. Also, the fail-safe system prevents the locking pins from being retracted unless the driver sets the semitrailer brakes before adjusting the sliding undercarriage on the semitrailer.

The patents to Lands et al. and Forman provide air operated cylinders and locking pins which are pneumatically released by the cylinders. But the systems described in these two patents do not provide a fail-safe all pneumatic system which prevents the locking pins from being retracted unless the semitrailer brakes are set and will automatically reset the pins if air pressure is applied to release the semitrailer brakes.

It is important to note that Department of Transportation Motor Carrier Safety Regulation 49 CFR 393.207(b) addresses the unsafe practice of entering highways with locking pins not inserted into the semitrailer's locking pin holes. This is an out-of-service violation per 49 CFR Chapter III, Subpart G, Appendix A to Part 386, and provides fines per violation up to $1,000 to a driver and $10,000 to a motor carrier. This regulation is enforced by each state, i.e., Colorado Revised Statute 42-4-234(1)(A) as amended and enforced by the Department of Public Safety Motor Carrier Safety Unit, Colorado State Patrol. The fail-safe elements of the subject system as described herein assists drivers and motor carriers in complying with the above federal and state regulations. Also, none of the above mentioned patents disclosed the unique fail-safe features and advantages of the subject locking system as described herein for improved efficiency and safety in the adjustment of the sliding undercarriage on the underside of a semitrailer.

SUMMARY OF THE INVENTION

In view of the foregoing, it is a primary object of the invention to provide a truck driver and truck owner the benefit of a reliable and fail-safe system which can easily reposition a sliding undercarriage on a semitrailer without potential injury to the driver or assistant. Also, over axle weight and out-of-service violations will decrease as a result of the simplified sliding undercarriage repositioning procedure.

Another object of the present invention is to provide a system wherein each locking pin is independently retracted and inserted by a double acting air cylinder. The system is designed to transmit adequate force, i.e. over 150 pounds, directly to each locking pin and reliably retract pins stuck in a semitrailer's locking pin holes.

A further object of the fail-safe locking system is the locking pins can only be retracted when the pressure in the semitrailer's spring brake chambers is vented to apply the spring brakes on the semitrailer. If the spring brakes on the semitrailer have not been set, an air pressure switch connected to a 4-way air valve prevents the air valve from actuating the air cylinders to retract the locking pins.

Another object of the new system is the double acting air cylinders provide insertion force greater than and in addition to locking pin springs used to retain each locking pin in a locked position in the semitrailer rails during highway travel.

Still another object of the invention is the system does not affect the operation of the tractor or semitrailer's electrical or pneumatic system. Specifically, the operation of the semitrailer's pneumatic spring brake system is not affected by the system's elements, unlike some prior art systems.

Yet another object of the invention is the simplicity and low cost of the locking system. Also, the installed cost of the system is comparable to the standard manually operated pin removal mechanism currently used on semitrailers. Further, the system can easily be installed as original equipment on the semitrailer's sliding undercarriage or retrofited on semitrailers already in use.

A further object of the invention is to eliminate the use of unsafe and difficult to use manually operated pin removal linkage mechanisms which are currently standard equipment on semitrailers.

The subject locking system is mounted on a sliding undercarriage of a semitrailer, the semitrailer pulled by a tractor. The locking system is used for securing and releasing the sliding undercarriage from a pair of parallel rails mounted on an underside of the semitrailer, the parallel rails having spaced apart locking pin holes along it's length. The locking system is a pneumatic system and includes one pair or two pair of air cylinders with pistons. The air cylinders are mounted on the sliding undercarriage and disposed next to the parallel rails. Locking pins are attached to each piston with a portion of the locking pins inserted into selected locking pins holes in a locked position in the parallel rails. A 4-way air valve is connected to the air cylinders and a pressurized air source on the semitrailer. The air valve directs pressurized air to the air cylinders for retracting the extending the pistons. An air pressure switch is connected to a pressurized air source to the semitrailer air brakes. The air pressure switch is connect to and controls the operation of the air valve when retracting the locking pins from the locking pin holes. The air pressure switch allows pin retraction only when air pressure is released to the semitrailer air brakes and spring brakes on the semitrailer are set. A pin release lever or release button is attached to the air valve and is used for releasing the locking pins when the spring brakes have been set.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
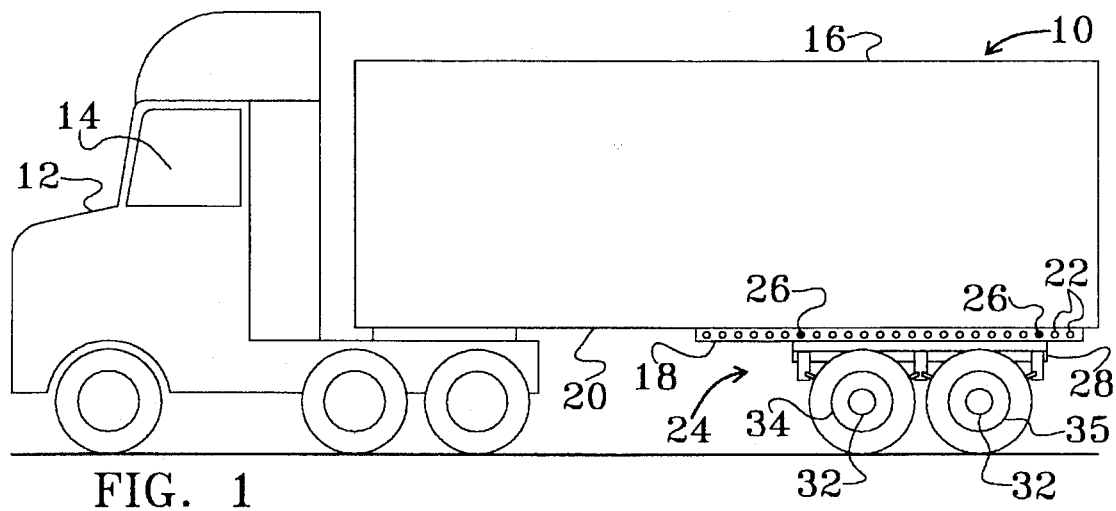
FIG. 1 is a side view of a typical highway tractor and semitrailer with a longitudinally sliding undercarriage mounted on the underside of the rear of the semitrailer.

In FIG. 1 a side view of a typical highway truck is shown having a general reference numeral 10. The truck 10 includes a tractor 12 with cab 14 with the tractor 12 pulling a semitrailer 16. The semitrailer 16 has a pair of parallel rails 18 mounted on an underside 20 of the semitrailer 16. The rails 18 include a plurality of pin locking holes 22 along the length thereof. The holes 22 are generally spaced 3 to 6 inches apart. A sliding undercarriage, having a general reference numeral 24, is locked to the rails 18 using two or more locking pins 26.

Figure 2:
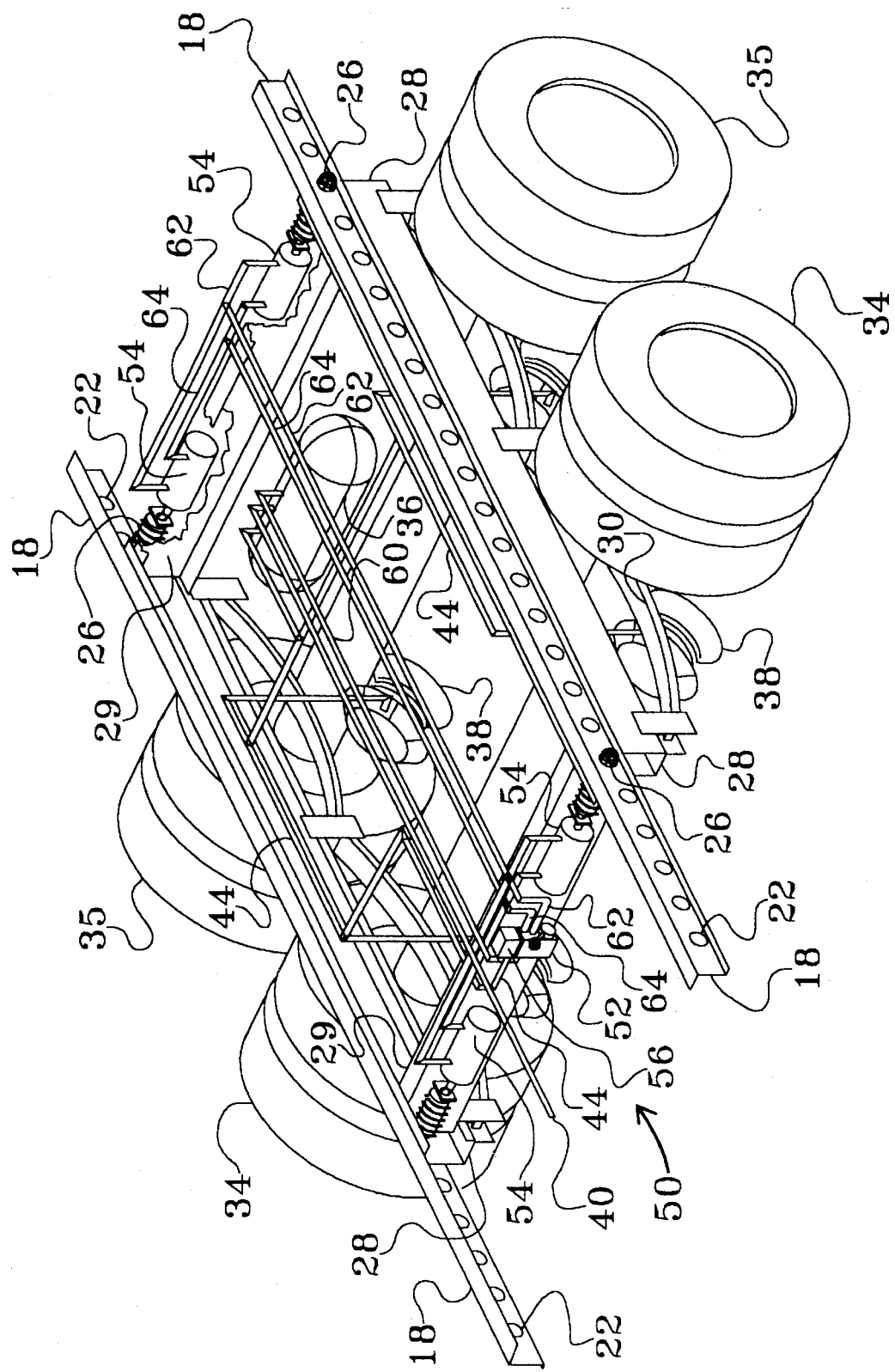
FIG. 2 is a perspective view of the sliding undercarriage mounted on a pair of axles with wheels and shown removed from the underside of the semitrailer.

Referring now to both FIGS. 1 and 2, the sliding undercarriage 24 includes an axle frame 28 with cross members 29, a spring suspension 30 attached to the frame 28, a pair of axles 32 attached to the spring suspension 30 and tandem front wheels 34 and tandem rear wheels 35 mounted on the axles 32. Also, the undercarriage 24 includes a semitrailer supply air tank 36 which supplies compressed air to spring operated air brakes 38. When air pressure is applied to the air brakes 38, the spring bias force in the air brakes is overcome unlocking the braking force on the semitrailer's wheels 34 and 35 and the semitrailer 16 is free to move. When the air pressure is vented or cut off for any reason, the spring bias force of the air brakes 38 is applied and a constant braking force is applied the wheels 34 and 35. The tank 36 receives pressurized air from a tractor air compressor via a supply air line 40. The air compressor is mounted on the tractor 12 and not shown in the drawings. An air brake relay value 42 is mounted on the frame 28 and connected to the air line 40 for directing pressurized air from the air compressor to the supply air tank 36 and from supply air tank 36 to each of the semitrailer's air brakes 38 via air brake lines 44.

Heretofore, the sliding undercarriage 24 was adjusted along the length of the rails 18 using the above mentioned manually operated pin release mechanism which was attached to pins 26 using a linkage system. The prior art pin release mechanism is not shown in the drawings. The manually operated release lever was mounted either in front of the front wheels 34 or between the front wheels 34 and rear wheels 35. The prior art manually operated pin release mechanism is difficult to operate if the semitrailer is parked with a slight twist in the frame, the mechanism is bent or damaged, or one or more pins 26 are stuck inside the locking pin holes 22. Also, it can be appreciated that since the mechanism is next to or between the wheels 34 and 35, the operation of changing the location of the sliding undercarriage 24 manually pulling or lifting the release lever while the driver is moving the tractor to loosen stuck pins is dangerous to the assistant. The subject locking system for a semitrailer sliding undercarriage as described herein provides a reliable system to retract pins and eliminates the use of the manually operated pin release mechanism for greater safety and reliability when adjusting the sliding undercarriage 24.

Figure 3:
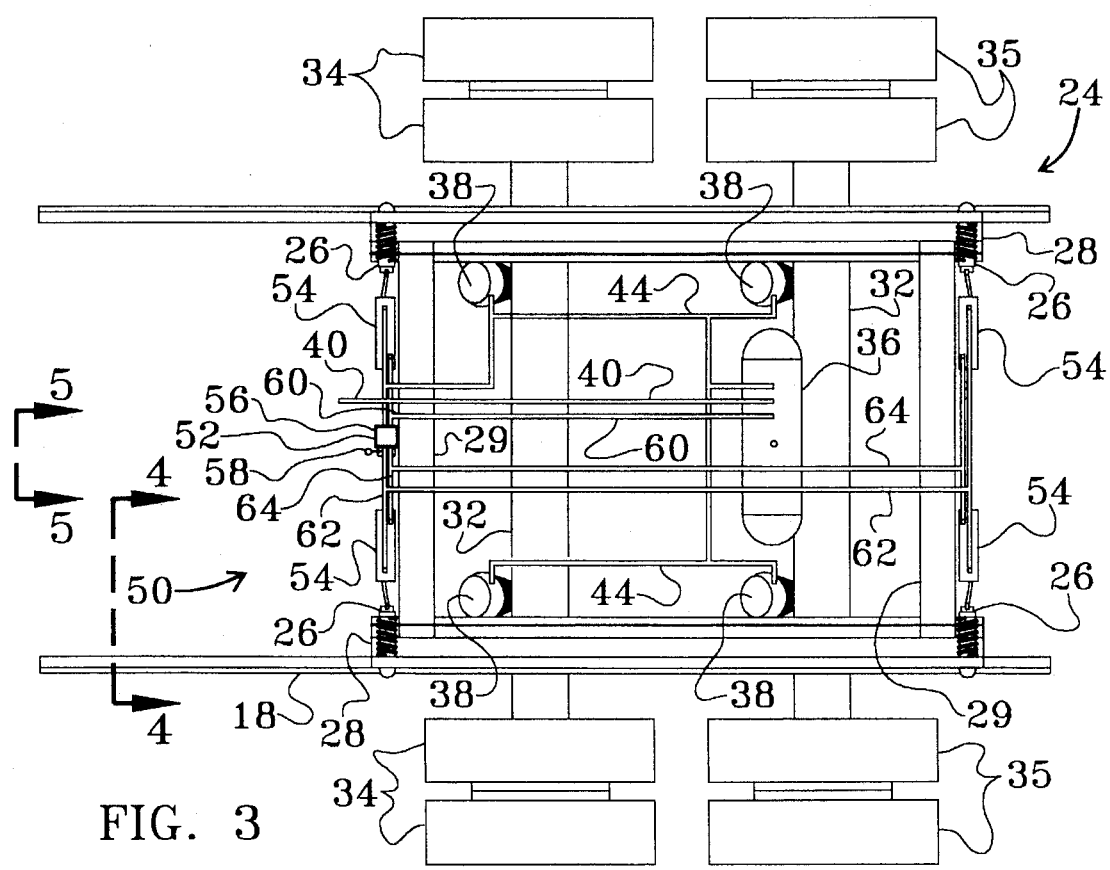
FIG. 3 is a top view of the sliding undercarriage with the subject locking system mounted thereon.
Figure 5:
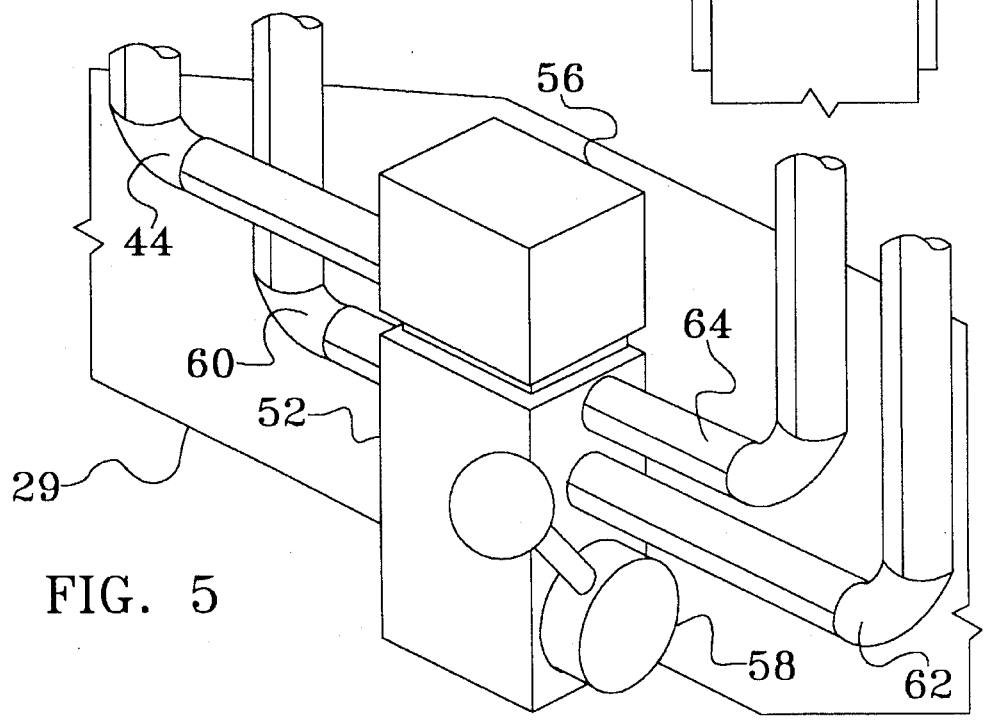
FIG. 5 is an enlarged front view of the air pressure switch and 4-way air valve with pin release lever. This view is taken along lines 5—5 shown in FIG. 3.

Referring now to FIG. 2 which is a perspective view of the sliding undercarriage 24, to FIG. 3 which is a top view of the sliding undercarriage 24, and to FIG. 5 an enlarged front view of the subject locking system which is mounted on the undercarriage 24 and has a general reference numeral 50. The locking system 50 broadly includes a 4-way air valve 52, two or more double acting air cylinders 54 with pistons 55 connected to the locking pins 26, an air pressure switch 56 mounted on one end of the 4-way air valve 52, and a pin release lever 58 mounted on an opposite end of the air valve 52.

In FIGS. 2 and 3, the 4-way air valve 52 is connected to the supply air tank 36 by air valve air line 60. The air pressure switch 56 is connected to the semitrailer's air brake lines 44. Also, the air valve 52 is connected to each of the locking systems air cylinders 54 by way of an air line 62 used for retracting the piston 55 in the air cylinder 54 and an air line 64 used for extending the pistons 55 and inserting the locking pins 26 in pin locking holes 22. The air lines 62 and 64 are clearly shown connected to one of the air cylinders 54 in FIG. 4. It should be noted that depending on the semitrailer manufacturer, the semitrailer 16 with parallel rails 18 may use a pair of locking pins 26 or two pair or four locking pins 26. In FIGS. 2 and 3 a second pair of locking pins 26 is connected to air cylinders 54 shown at the rear of the sliding undercarriage 24. For simplicity in describing the subject locking system 50, the air lines the second pair of air cylinders 54 is not discussed. It can be appreciated that to those skilled in the art of dealing with air systems used on highway trucks and semitrailers that the hook up of the second pair of air cylinders 54 would be similar as described above.

Figure 4:
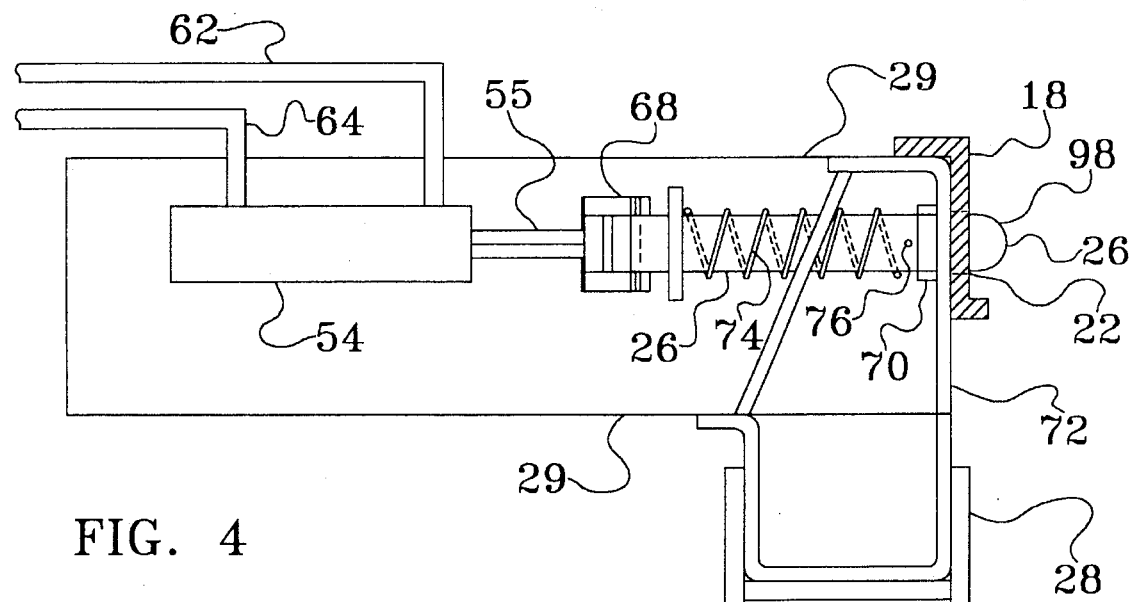
FIG. 4 is an enlarged front view of a locking pin and air cylinder with the locking pin received in a locking pin hole in one of the semitrailer's parallel rails. This view is taken along lines 4—4 shown in FIG. 3.

In FIG. 4 a front view of a portion of the axle frame 28 and one of the cross members 29 is shown taken along lines 4—4 shown in FIG. 3. Also, one of the parallel rails 18 is shown in cross section. In this view, the air cylinder 54 is secured to the side of the cross member 29 using a mounting bracket 66. The piston 55, which is part of the air cylinder 54, is pivotally attached to the locking pin 26 using a swivel connector 68. The locking pin 26 is attached to the axle frame 28 by a bushing 70 mounted on an angular shaped upper portion 72 of the frame 28. The locking pin 26 includes a coil spring 74 received around a portion of the length of the pin 26 and held in compression between a spring pin 76 mounted on the locking pin 26 and part of the upper portion 72 of the frame 26. The coil spring 74 acts to bias the locking pin 26 toward engagement of a chamfered end 78 of the pin 26 through one of the locking pin holes 22 as shown in this drawing. The air cylinder 54 is shown in this drawing pressurized to force the locking pin 26 into an extended and locked position in one of the pin holes 22 of the rail 18. When the air pressure to the cylinder 54 is reversed, the pin 26 is moved from right to left and in an unlocked or disengaged position from the rail 18. The sliding undercarriage 24 is now free to be adjusted along the length of the rails 18.

OPERATION OF THE LOCKING SYSTEM

The operation of the locking system 50 will now be described in conjunction with a discussion of FIG. 5 of the drawings. As background information, it should be mentioned that the 4-way air valve 52 receives air pressure from the supply air tank 36 for the operation of the air cylinders 54. The pressure in the semitrailer's air brake system is monitored by the air pressure switch 56. It has been found that semitrailer supply air tanks typically have threaded plugs which are provided by the tank manufacturer to allow devices such as an air spring suspension or power lift platform to be added to the semitrailer. Therefore, connecting the 4-way air valve 52 and air cylinders 54 to the semitrailer's air tank 36 and adding air pressure switch 56 for monitoring pressure in the air brake system does not effect the operation of the semitrailer's air brake system. It is important to note the air pressure switch 56 prevents operation of the 4 -way air valve 52 and is a fail-safe feature of the locking system 50. If the air brake system is pressurized, then the air brakes 38 have been released and therefore the air pressure switch 56 is pressurized and the pin release lever 58 is prevented from operating the air valve 52 and applying air pressure through the air line 62 for having the air cylinders 54 retract the locking pins 26. Air valve 52 in the fail-safe position does provide air pressure to the air cylinders 54 through the air line 64 continually force the locking pins 26 into locked positions.

If the semitrailer's air brakes 38 are set by venting the air pressure via air brake lines 44 to the air brakes 38, then the air pressure is vented to the air pressure switch 56. When this occurs, the operator of the truck 10 or an assistant can now operate the pin release lever 58 on the air valve 52 for retracting the locking pins 26. While the pin release lever 58 is shown it can be appreciated that a pin release button or any other type of release mechanism can be used equally well in the operation of the 4-way air valve 52. At this time the air valve 52 directs air pressure through air line 62 to the two air cylinders 54 to actuate the cylinders and retract the pistons 55 which in turn retract the locking pins 26 from the parallel rails 18. The air pressure force, over 150 pounds, is sufficient to remove the pins 26 from the rails 18 even though the pins 26 may be stuck inside the locking pin holes 22 of the rails 18. When the cylinders 54 are actuated, the air pressure on the opposite side of the piston 55 is vented through air line 64 and the air valve 52.

When the locking pins 26 have been removed from the parallel rails 18, the semitrailer 16 is now ready to be repositioned on the sliding undercarriage 24. After the driver has properly repositioned the semitrailer 16 at a new location on the sliding undercarriage 24, the pin release lever 58 is used to reverse the direction of air pressure from the air line 64 and now through the air line 62 to again extend the pistons 55 and the locking pins 26 into a locked position in newly selected pin locking holes 22. Air pressure on the opposite end of the air cylinder 54 is now vented through air line 62 and the air valve 52.

The above reinsertion of the locking pins 26 into newly selected pin holes 22 can also be accomplished by the driver of the truck 10 pressurizing the semitrailer's air brakes 38 to release the brakes. At this time the air pressure switch 56 senses the increase in air pressure and opens the air valve 52. Automatically, air pressure is directed through the air valve 52 and air line 64 to extend the pistons 55 of the cylinders 54 for extending the locking pins 26 into a locked position.

Upon completion of the changing of the position of the semitrailer 16 on the sliding undercarriage 24 using the subject fail-safe locking system 50, if the semitrailer's air brakes 38 are still set, air pressure can now be applied to the air brakes 38 by the truck's driver to release the brakes. The tractor 12 and semitrailer 16 are now ready for being driven safely on the highway.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having semitrailer spring operated air brakes operated from an air brake line connected to a pressurized air tank on the semitrailer, the locking system comprising:

a pair of air cylinders with pistons, said air cylinders mounted on the sliding undercarriage and disposed next to the parallel rails;

locking pins attached to said pistons, a portion of said locking pins inserted into selected locking pins holes in the parallel rails;

a 4-way valve connected to said air cylinders and to an air line connected to the air tank on the semitrailer, said air valve directing pressurized air to said air cylinders for retracting and extending said pistons in said cylinders;

an air pressure switch connected to the air brake line semitrailer and connected to said air valve for automatically controlling the operation of opening and closing of said air valve during the retracting of said locking pins from the locking pin holes and allowing pin retraction only when air pressure is released via the air brake line to the semitrailer air brakes and the spring brakes are set on the sliding undercarriage, said air pressure switch sensing pressurization or release of air pressure through the air brake line to the semitrailer's air brakes;

an air valve operating means connected to said air valve for operating said air valve and retracting said locking pins from the locking pin holes and extending said locking pins in the locking pin holes when air pressure is released via the air brake line to the semitrailer air brakes and the spring brakes are set on the sliding undercarriage; and said air pressure switch preventing operation of said air valve operating means and said air valve when air pressure is applied to the air brake line and allowing only for said air valve to provide air pressure to said air cylinders for extending the pistons in said cylinders.

2. The locking system as described in claim 1 wherein said air pressure switch senses increased air pressure via the air brake line to the semitrailer air brakes for releasing the air brakes and said air pressure switch automatically controlling said air valve for reinserting said locking pins into the locking pin holes.

3. The locking system as described in claim 1 wherein said air cylinders are double acting air cylinders, said air cylinders connected to said air valve by a pair of air cylinders air lines, one of said air cylinder air lines used for applying air pressure for extending said pistons in said air cylinders and the other air cylinder air lines used for applying air pressure for retracting said pistons in said air cylinders.

4. The locking system as described in claim 1 wherein said air pressure switch is mounted on one end of said 4-way air valve, said air pressure switch and said air valve mounted on the sliding undercarriage of the semitrailer.

5. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having semitrailer spring operated air brakes operated from a pressurized air source on the semitrailer or tractor, the locking system comprising:

a pair of individual air cylinders with pistons, said air cylinders mounted on the sliding undercarriage and disposed next to the parallel rails;

locking pins attached to said pistons, a portion of said locking pins inserted into locking pins holes in the parallel rails by the pistons;

an air valve connected to said air cylinders and the pressurized air source on the semitrailer or tractor, said air valve directing pressurized air to said air cylinders for retracting and extending the pistons individually in said cylinders;

air valve operating means connected to said air valve for operating said air valve when directing pressurized air to said air cylinders for retracting and extending the pistons individually in said cylinders;

an air pressure switch connected to the pressurized air source on the semitrailer or tractor and connected to said air valve, said air pressure switch monitoring air pressure to the air brake, said air pressure switch allowing operation of the said air valve for providing air pressure to said air cylinders for retracting and extending the pistons in said cylinders when air pressure is vented to the air brakes, said air pressure switch preventing operation of said air valve operating means and said air valve when air pressure is applied to the air brakes and allowing only for said air valve to provide air pressure to said air cylinders for extending the pistons in said cylinders;

said air valve providing air pressure from the pressurized air source to said air cylinders for allowing retracting of each of said locking pins individually from the locking pin holes only when the semitrailer is parked and when the air brakes on the sliding undercarriage have been set and air pressure is vented to the air brakes;

said air valve providing air pressure from the pressurized air source to said air cylinders for inserting each of said locking pins individually into selected locking pin holes when the semitrailer is parked and when the air brakes on the sliding undercarriage have been set and air pressure is vented to the air brakes;

said air valve providing air pressure from the pressurized air source to said air cylinders for automatically reinserting each of said locking pins individually into unselected locking pin holes when air pressure is applied to the air brakes for releasing the air brakes during a startup of the tractor and semitrailer; and said air valve providing continuous air pressure from the pressurized air source to said air cylinders for continually forcing said locking pins individually in the locking pin holes when air pressure has been applied to the air brakes and the air brakes have been released during highway travel of the tractor and semitrailer.

6. The locking system as described in claim 5 wherein said air cylinders are double acting air cylinders.

7. The locking system as described in claim 5 wherein said air pressure switch and said air valve are mounted on the sliding undercarriage of the semitrailer.

8. The locking system as described in claim 5 wherein said air pressure switch is connected to an air brake line connected to the spring operated air brakes and to the pressurized air source on the semitrailer or tractor.

9. The locking system as described in claim 5 wherein said air valve is a 4-way valve.

10. The locking system as described in claim 5 wherein said air valve operating means is a pin release lever connected to said air valve and for operating said air valve.

11. The locking system as described in claim 5 wherein said air valve operating means is a pin release button connected to said air valve and for operating said air valve.

12. A locking system for mounting on a sliding undercarriage of a semitrailer, the semitrailer pulled by a tractor, the locking system used for securing and releasing the sliding undercarriage from a pair of parallel rails mounted on an underside of the body of the semitrailer, the parallel rails having spaced apart locking pin holes along the length thereof, the sliding undercarriage having semitrailer spring operated air brakes operated from an air brake line connected to a pressurized air tank on the semitrailer, the air tank receives pressurized air from a tractor air compressor via a supply air line, the locking system comprising:

a pair of air cylinders with pistons, said air cylinders mounted on the sliding undercarriage and disposed next to the parallel rails;

locking pins attached to the pistons, a portion of said locking pins inserted into selected locking pins holes in the parallel rails;

a 4-way air valve connected to said air cylinders and to an air line connected to the air tank on the semitrailer, said air valve directing pressurized air to said air cylinders for retracting and extending said pistons individually in said cylinders;

air valve operating means connected to said air valve for operating said air valve when directing pressurized air to said air cylinders for retracting and extending the pistons individually in said cylinders;

an air pressure switch connected to the air brake line and connected to said air valve, said air pressure switch monitoring air pressure to the air brakes, said air pressure switch allowing operation of the said air valve for providing air pressure to said air cylinders for retracting and extending the pistons in said cylinders when air pressure is vented to the air brakes, said air pressure switch preventing operation of said air valve operating means and said air valve when air pressure is applied to the air brakes and allowing only for said air valve to provide air pressure to said air cylinders for extending the pistons in said cylinders;

said air valve providing air pressure from the air line to said air cylinders for allowing retracting of each of said locking pins individually from the locking pin holes only when the semitrailer is parked and when the air brakes on the sliding undercarriage have been set and air pressure is vented to the air brakes;

said air valve providing air pressure from the air line to said air cylinders for inserting each of said locking pins individually into selected locking pin holes when the semitrailer is parked and when the air brakes on the sliding undercarriage have been set and air pressure is vented to the air brakes;

said air valve providing air pressure from the air line to said air cylinders for automatically reinserting each of said locking pins individually into unselected locking pin holes when air pressure is applied to the air brakes for releasing the air brakes during a startup of the tractor and semitrailer; and said air valve providing continuous air pressure from the air line to said air cylinders for continually forcing said locking pins individually in the locking pin holes when air pressure has been applied to the air brakes and the air brakes have been released during highway travel of the tractor and semitrailer.

13. The locking system as described in claim 12 wherein said air cylinders are double acting air cylinders, said air cylinders connected to said air valve by a pair of air cylinders air lines, one of said air cylinder air lines used for applying air pressure for extending the pistons in said air cylinders and the other air cylinder air lines used for applying air pressure for retracting the pistons in said air cylinders.

14. The locking system as described in claim 12 wherein said air pressure switch is mounted on one end of said 4-way air valve, said air pressure switch and said air valve mounted on the sliding undercarriage of the semitrailer.

15. The locking system as described in claim 12 further including an additional pair of air cylinders with pistons, said air cylinders mounted on the sliding undercarriage and disposed next to the parallel rails, the pistons attached to locking pins, a portion of said locking pins inserted into selected locking pins holes in the parallel rails, said additional air cylinders connected to said 4-way air valve.

16. The locking system as described in claim 12 wherein said air cylinders with pistons apply air pressure force of 150 pounds and greater for retracting said locking pins from the locking pin holes and inserting said locking pins in newly selected locking pin holes.

* * * * *